Nov. 16, 1943.  E. S. MARIOTTE  2,334,272
FEED PLUNGER CONSTRUCTION FOR BAR STOCK FEED MECHANISM
Filed June 16, 1942

INVENTOR.
Eugene S. Mariotte
BY
Bodell & Thompson
Attys.

Patented Nov. 16, 1943

2,334,272

UNITED STATES PATENT OFFICE 2,334,272

FEED PLUNGER CONSTRUCTION FOR BAR STOCK FEED MECHANISM

Eugene S. Mariotte, Syracuse, N. Y., assignor to Lipe-Rollway Corporation, Syracuse, N. Y., a corporation of New York Application June 16, 1942, Serial No. 447,244

4 Claims. (Cl. 29—59)

This invention relates to bar feeding mechanism for automatic metal working machines of the type where the bar stock is fed through the rotating spindle of the machine and against a stop during each feeding operation, by fluid or air pressure acting against a piston in the feed tube and connected to the plunger also movable in the feed tube. It has for its object a plunger construction by which the rebound of the bar away from the stop of the machine is snubbed during each feeding operation, the snubbing operation including the quick returning of the bar against the stop after each rebound before the chuck or collet mechanism of the machine grips the bar. It will be understood that the mechanism of these automatic metal working machines works so fast that oftentimes the stock bar is gripped by the chuck and collet mechanism, while the bar is in the middle of the rebound from the stop of the machine, so that the cutting tools of the machine commence to work on the bar, while the bar is away from the stop. This results in defective work and also in injury to the cutting tools because of the bar not being against the stop.

The invention consists in the novel features and in the combinations and constructions hereinafter set forth and claimed.

In describing this invention, reference is had to the accompanying drawing, in which like characters designate corresponding parts in all the views.

This invention relates to the feed plunger construction. 1 designates the head of the lathe; 2 the hollow rotatable spindle mounted therein and having any suitable collet or chuck mechanism 3 for gripping the bar stock B. 4 designates the tail stock or any other means for providing a stop 4 for the bar B, when the bar has been properly fed into the machine. 5 designates the feed tube which is normally mounted in alinement with the spindle 2, this tube being suitably supported, and at its rear end, having suitable hose connection at C with a source of pressure fluid, as compressed air. The compressed air system has suitable control valves therein. The system and the mounting of the tube form no part of the invention, and the tube may be mounted and the air system arranged as set forth in my pending application Serial Number 399,641, filed June 25, 1941, or in any other suitable manner.

In this construction and as in the construction shown in application Serial Number 399,641 referred to, the muzzle end of the tube 5 is spaced apart from the spindle 2 at S and the plunger to be described passes across this space into the spindle 2, as the bar stock becomes short.

Figure 1:
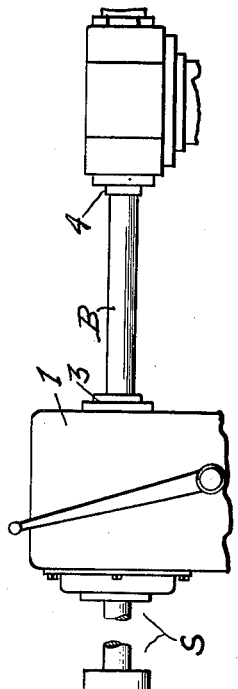
Figure 1 is a fragmentary elevation of an automatic metal working machine as a lathe with the feed tube of the feeding mechanism and the bar stock therein.
Figure 2:
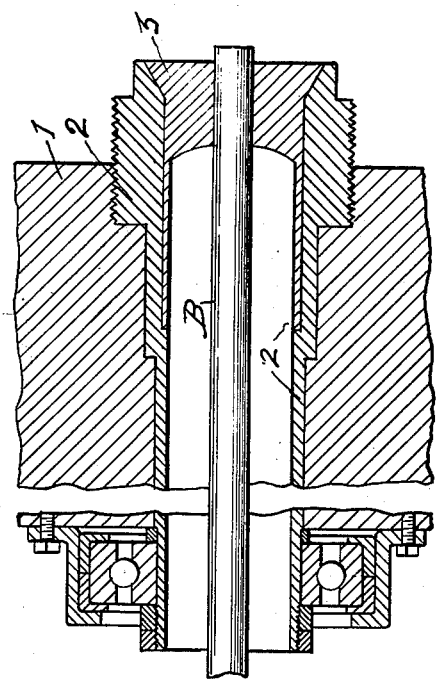
Figure 2 is an enlarged sectional view of the plunger construction, the piston and the contiguous portion of the feed tube and of the bar stock being also shown.
Figure 3:
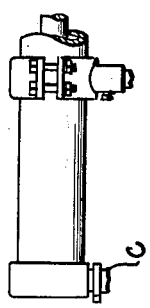
Figure 3 is an enlarged fragmentary sectional view through the head stock of the metal working machine showing the hollow live spindle therein including the chuck or collet.

The plunger, constituting the subject matter of this invention, is shown in Figure 2. It includes front and rear sections 6, 7 having relative axial movement, the front section being formed with a socket 8 for receiving the end of the bar stock B, and a spring 9 interposed between the sections for resisting relative axial movement and returning the front section forwardly to quickly take up the rebound of the bar B away from the stop 4. The rear section 7 is connected to a suitable piston 10 in the tube, as by a rod 11, this rod 11 being for the purpose of bridging the space S when the feed plunger is in the hollow spindle 2. When a new bar is to be inserted, the plunger can be pulled out of the spindle by taking hold of the rod 11 and then pushing the piston 10 rearwardly in the tube, and when the plunger is thus withdrawn out of the spindle 2, the end of a new bar is thrust into the socket 8 and the plunger and piston pushed back to the rear end of the feed tube 5. This connecting rod feature 11 forms no part of this invention.

The front section 6 of the feed plunger includes an outer tubular body which slidably fits the tube 5 and also the spindle, and a head 12 which is formed with the socket 8 and with a stem 13 mounted, as through antifriction journal and thrust bearings in the tubular body, so as to be axially rotatable with the bar stock B. The rear section 7 is formed with a head which slidably fits the tube and a stem 14 telescoping within the rear end of the tubular body of the front section 6. A pin 15 extends transversely through a stem and into lengthwise slots 16 in the tubular body of the front section 6, the slots permitting relative axial movement of the sections 6, 7. The rear end of the tubular body of the front section 6 is normally spaced at 17 from the front end of the head of the rear section 7 to permit relative axial movement.

The spring 9 is interposed between the sections 6, 7, it being here shown as located within the rear end of the tubular body of the front section 6 and interposed between the front end face of the stem 14 of the rear section 7 and against a shoulder at 18 within the tubular body.

The connecting rod 11 is also preferably connected to one of the parts it connects, as the rear section 7 of the plunger, by an antifriction journal and thrust bearing 20, which has a slight universal joint action. The socket 8 is provided with two thrust conical surfaces 21, 22 of different angles. The innermost conical surface 21, that is, the surface near the inner or bottom end of the socket is of greater angle than the surface 22 at the outer end, the inner conical surface 21 being about 60° and the outer surface 22 being about 35° or less than 45°. The conical surface of sockets of machines of this type have usually been of one angularity throughout and the angle being greater than 45°. Hence bars of larger diameter have a tendency to climb up a surface of greater angularity instead of centering. By making the conical surface, as 22, which receives the bars of larger diameter, of smaller angle, as 35°, this tendency to climb or displace is eliminated, and also by making the rear end of the socket of larger angularity for receiving bars of small diameter, a socket may be provided for accommodating the bars of large or small diameter without appreciably increasing the axial length of the socket 8.

In operation during the feeding of the piston 10 and plunger when the collet 3 is open, the bar B is fed through the spindle against stop 4 and invariably rebounds therefrom. The spring, which is initially loaded, is additionally loaded by the rebound and immediately returns the bar B against the stop 4 before the jaws of the collet 3 grip the bar. The time within which the jaws of the chuck or collet act is a small fraction of a second, but the spring 18 reacts within that fraction of a second, so that the bar B is always against the stop when the jaws of the chuck or collet grip it.

What I claim is:

1. A feed plunger construction for the bar stock feed mechanism of automatic metal working machines in which the feed plunger is actuated by air pressure against a piston movable with the plunger in a tube, to push the bar stock through the spindle and against the stop of the metal working machine during each feeding operation, said plunger comprising front and rear sections, the front section having a socket for receiving the end of the bar stock, and the rear section being connected to the piston in the feed tube, the sections having relative axial sliding movement, and a spring between the sections for yieldingly resisting relative axial movement and snubbing the rebound of the bar stock away from the stop of the machine.

2. A feed bar plunger construction for the bar stock mechanism of automatic metal working machines in which the feed plunger is actuated by air pressure against a piston movable with the plunger in a tube, to push the bar stock through the spindle and against the stop of the metal working machine during each feeding operation, said plunger comprising front and rear sections, the front section having a socket for receiving the end of the bar stock, the rear section being connected to said piston, one section slidably telescoping one within the other and a spring between the sections for resisting relative sliding movement and snubbing the rebound of the bar stock away from the stop of the machine.

3. A feed bar plunger construction for the bar stock mechanism of automatic metal working machines in which the feed plunger is actuated by air pressure against a piston movable with the plunger in a tube, to push the bar stock through the spindle and against the stop of the metal working machine during each feeding operation, said plunger comprising front and rear sections, the front section including an outer tubular body and a head rotatably mounted in the body and formed with a socket for receiving the end of the bar stock, the rear section being connected to the piston in the feed tube, the sections having relative axial sliding movement, and a spring between the sections, located to resist axial movement of the front section relatively to the rear section when the bar stock is thrust against the stop of the metal working machine during the feeding operation and hence to take up the rebound of the bar stock.

4. A feed bar plunger construction for the bar stock mechanism of automatic metal working machines in which the feed plunger is actuated by air pressure against a piston movable with the plunger in a tube, to push the bar stock through the spindle and against the stop of the metal working machine during each feeding operation, said plunger comprising front and rear sections, the front section comprising a tubular body slidably fitting the tube, and a head rotatably mounted in the body and formed with a socket for receiving the end of the bar stock, the rear section including a body slidably fitting the said tube and connected to the piston, and having a stem slidably fitting the rear end of the tubular body of the front section, and a spring thrusting against the end of said stem and against a shoulder within the tubular body, for yieldingly resisting relative axial movement and snubbing the rebound of the bar stock away from the stop of the machine.

EUGENE S. MARIOTTE.